(12) United States Patent
Kataoka et al.

(10) Patent No.: US 7,559,304 B2
(45) Date of Patent: Jul. 14, 2009

(54) CONTROL DEVICE AND CONTROL METHOD FOR STOPPING AND STARTING AN INTERNAL COMBUSTION ENGINE

(75) Inventors: Kenji Kataoka, Susono (JP); Kimitoshi Tsuji, Susono (JP); Yasushi Kusaka, Susono (JP); Toyoaki Kurita, Oobu (JP); Masaki Takeyama, Okazaki (JP)

(73) Assignees: Toyota Jidosha Kabushiki Kaisha, Toyota (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 0 days.

(21) Appl. No.: 11/547,125

(22) PCT Filed: Jun. 10, 2005

(86) PCT No.: PCT/JP2005/011079

§ 371 (c)(1), (2), (4) Date: Oct. 4, 2006

(87) PCT Pub. No.: WO2005/121531

PCT Pub. Date: Dec. 22, 2005

(65) Prior Publication Data

US 2007/0261668 A1      Nov. 15, 2007

(30) Foreign Application Priority Data

Jun. 11, 2004   (JP) .............................. 2004-174490

(51) Int. Cl.
*F02N 17/00*   (2006.01)
*F02D 41/06*   (2006.01)
*F02D 13/08*   (2006.01)

(52) U.S. Cl. .............................. 123/179.4; 123/179.18; 123/348

(58) Field of Classification Search ................. 123/348, 123/179.18, 361, 376, 179.4
See application file for complete search history.

(56) References Cited

U.S. PATENT DOCUMENTS 4,700,684 A  *  10/1987  Pischinger et al. ............. 123/21

(Continued)

FOREIGN PATENT DOCUMENTS

DE           101 23 037 A1      11/2002

(Continued)

OTHER PUBLICATIONS

Kataoka et al.; "Crankshaft Positioning Utilizing Compression Force and Fast and Fast Starting with Combustion Assist for Indirect Injection Engine;" SAE Technical Paper Series; 2005-01-1166; Reprinted from: Advanced Hybrid Vehicle Powertrains 2005 (SP-1973); 2005 SAE World Congress; Detroit, Michigan; Apr. 11-14, 2005.

*Primary Examiner*—Michael Cuff
*Assistant Examiner*—Ka Chun Leung
(74) *Attorney, Agent, or Firm*—Oliff & Berridge, PLC

(57) ABSTRACT

The present invention has an object of providing a technology capable of stopping and starting an internal combustion engine more preferably by restraining vibrations when the internal combustion engine stops and a scatter in crank angle when the internal combustion engine stops. For a period till an actual stop of the internal combustion engine since a stopping condition of the internal combustion engine was established, an air quantity of air flowing into a cylinder of the internal combustion engine is decreased when a number of revolutions of the engine is higher than a specified number of revolutions (S102) and is increased when the number of revolutions of the engine is equal to or lower than the specified number of revolutions (S106).

3 Claims, 6 Drawing Sheets

U.S. PATENT DOCUMENTS

| | | | |
|---|---|---|---|
| 6,412,458 B2 * | 7/2002 | Kawasaki et al. | 123/90.15 |
| 6,718,939 B2 * | 4/2004 | Iwasaki et al. | 123/319 |
| 6,886,515 B2 | 5/2005 | Ogawa | |
| 6,910,457 B2 | 6/2005 | Grieser et al. | |
| 2006/0022359 A1 * | 2/2006 | Edamatsu et al. | 261/39.1 |
| 2007/0151544 A1 * | 7/2007 | Arai et al. | 123/376 |

FOREIGN PATENT DOCUMENTS

| | | |
|---|---|---|
| EP | 1 074 713 A1 | 2/2001 |
| EP | 1 367 246 A1 | 12/2003 |
| EP | 1 400 687 A2 | 3/2004 |
| EP | 1 413 727 A1 | 4/2004 |
| JP | A-08-193531 | 7/1996 |
| JP | A-09-014017 | 1/1997 |
| JP | A-2000-257458 | 9/2000 |
| JP | A-2001-173473 | 6/2001 |
| JP | A-2001-227380 | 8/2001 |
| JP | A-2002-339781 | 11/2002 |
| JP | A-2003-343317 | 12/2003 |
| JP | A-2004-143939 | 5/2004 |
| JP | A-2004-162707 | 6/2004 |
| LU | 90909 A1 | 10/2003 |

* cited by examiner

CONTROL DEVICE AND CONTROL METHOD FOR STOPPING AND STARTING AN INTERNAL COMBUSTION ENGINE

TECHNICAL FIELD

The present invention relates generally to a control device and a control method of an internal combustion engine, and more particularly to a control device and a control method for controlling the internal combustion engine when stopping or starting the internal combustion engine.

BACKGROUND ARTS

For restraining vibrations caused due to a pressure within a cylinder (which will hereinafter simply be referred to as an in-cylinder pressure) when an internal combustion engine stops, there has hitherto been known a technology (refer to, e.g., Japanese Patent Application Laid-Open Publication No. 2000-257458) of decreasing the in-cylinder pressure by reducing an air quantity in the cylinder in advance of a stop of the internal combustion engine.

On the other hand, if the in-cylinder pressure is lowered when the internal combustion engine stops, a crank angle when the internal combustion engine stops gets easy to scatter. If there occurs the scatter in the crank angle when the internal combustion engine stops, it follows that there must be a scatter in position of a piston in the cylinder when restarting the internal combustion engine. As a result, there also must be scatters in time and in energy expended for restarting the internal combustion engine, and this leads to deterioration in drivability and in fuel consumption when restarting the internal combustion engine.

Such being the case, there is known a technology (refer to, e.g., Japanese Patent Application Laid-Open Publication No. 2001-173473) of raising, conversely to the former case, the in-cylinder pressure by increasing the air quantity in the cylinder in advance of stopping the internal combustion engine in order to restrain the scatter in the crank angle when the internal combustion engine stops. If the in-cylinder pressure rises when the internal combustion engine stops as described above, however, the vibrations of the internal combustion engine is liable to increase.

Further, for example, Japanese Patent Application Laid-Open Publication No. 9-14017 and Japanese Patent Application Laid-Open Publication No. 8-193531 are exemplified as the prior arts of the present invention.

DISCLOSURE OF THE INVENTION

It is an object of the present invention, which was devised in view of the problems described above, to provide a technology capable of stopping and starting an internal combustion engine more preferably by restraining vibrations when the internal combustion engine stops and restraining a scatter in crank angle when the internal combustion engine stops.

A first invention adopts the following means in order to accomplish this object. Namely, the first invention is that, when stopping the internal combustion engine, an air quantity of air flowing into a cylinder of an internal combustion engine is at first decreased and thereafter increased just before the stop of the internal combustion engine.

More specifically, a control device of an internal combustion engine according to the first invention comprises stopping condition establishment judging means for judging whether a stopping condition of the internal combustion engine is established or not, and inflow air quantity control means for decreasing an air quantity of air flowing into a cylinder of the internal combustion engine when a rotational speed of the internal combustion engine is higher than a specified rotational speed, and increasing the air quantity of the air flowing into the cylinder of the internal combustion engine when the rotational speed of the internal combustion engine is equal to or lower than the specified rotational speed during a period from the time when the stopping condition establishment judging means judges that the stopping condition is established to the time when the internal combustion engine actually stops.

Herein, when decreasing the air quantity of the air flowing into the cylinder (which will hereinafter be referred to as an inflow air quantity) of the internal combustion engine, there is decreased a smaller inflow air quantity than the inflow air quantity at a point of time when the stopping condition of the internal combustion engine is established. Further, when increasing the inflow air quantity, there may be increased the greater inflow air quantity than the inflow air quantity at the point of time when the stopping condition of the internal combustion engine is established and may also be increased the greater inflow air quantity than the inflow air quantity when decreasing the inflow air quantity.

During a period from the time when the stopping condition of the internal combustion engine has been established to the time when the internal combustion engine actually stops, a rotational speed of the internal combustion engine (which will hereinafter simply be termed a rotational speed of the engine) is gradually decreased.

Namely, according to the present invention, the inflow air quantity is decreased during the period from the time when the stopping condition of the internal combustion engine has been established to the time when the rotational speed of the engine reaches a specified rotational speed. As a result, an in-cylinder pressure is reduced during this period, and hence vibrations of the internal combustion engine can be restrained. Further, after the rotational speed of the engine has decreased under the specified rotational speed, the inflow air quantity rises. As a consequence, the in-cylinder pressure just before the actual stop of the internal combustion engine rises, and therefore it is possible to restrain a scatter in crank angle when the internal combustion engine stops. This enables the internal combustion engine to stop and start more preferably.

Note that the stopping condition of the internal combustion engine may be, for example, ignition-OFF by a driver and may also be an auto-stop condition of the internal combustion engine in an economy running system and a hybrid system.

Moreover, the rotational speed is a predetermined value and may also be the rotational speed just before the actual stop of the internal combustion engine.

What can be exemplified as the specified rotational speed is a rotational speed from which the internal combustion engine can be judged to actually stop when a crank shaft of the internal combustion engine rotates for one more cycle (this rotational speed of the engine will hereinafter be called a rotational speed just before the stop).

In this case, there is increased the air flowing into the cylinder at an intake stroke at the last one cycle before the stop of the internal combustion engine. The inflow air quantity is kept decreasing just before the stop of the internal combustion engine by increasing the inflow air quantity at such a timing. Accordingly, the vibrations of the internal combustion engine can be more restrained.

In the present invention, in the case where the internal combustion engine is a multi-cylinder internal combustion engine having a plurality of cylinders, if the rotational speed of the engine is equal to or lower than the rotational speed just before the stop, there may be increased only the inflow air quantities into an explosion stroke cylinder reaching an explosion stroke when the internal combustion engine actually stops and into a compression stroke cylinder reaching a compression stroke when the internal combustion engine actually stops among the plurality of cylinders.

In the multi-cylinder internal combustion engine, if a reaction by the air in the explosion stroke cylinder and a reaction by the air in the compression stroke cylinder are large when the internal combustion engine stops, the scatter in the crank angle when the internal combustion engine stops is restrained. Such being the case, when the rotational speed of the engine gets equal to or lower than the rotational speed just before the stop, the air quantities in the explosion stroke cylinder and in the compression stroke cylinder when the internal combustion engine stops are augmented by increasing the inflow air quantities into the explosion stroke cylinder and into the compression stroke cylinder. As a result, there rise the reactions by the air in the explosion stroke cylinder and by the air in the compression stroke cylinder, thereby making it possible to restrain the scatter in the crank angle when the internal combustion engine stops.

Moreover, even when the rotational speed of the engine becomes equal to or lower than the rotational speed just before the stop, a timing of increasing the inflow air quantity can be further delayed by increasing only the inflow air quantities into the explosion stroke cylinder and into the compression stroke cylinder and reducing the inflow air quantities into an intake stroke cylinder reaching an intake stroke when the internal combustion engine stops and into an exhaust stroke cylinder reaching an exhaust stroke when the internal combustion engine stops. As a result, the vibrations of the internal combustion engine can be more restrained.

Herein, if the inflow air quantity control means is a throttle valve provided in an intake passage of the internal combustion engine, only the inflow air quantities into the explosion stroke cylinder and into the compression stroke cylinder may also be increased by adjusting a timing of increasing the valve-opening degree of the throttle valve. Namely, when the rotational speed of the internal combustion engine is equal to or smaller than the specified rotational speed, the valve-opening degree of the throttle valve may be increased at the timing when there augment only the inflow air quantities into the explosion stroke cylinder and into the compression stroke cylinder.

Moreover, if the inflow air quantity control means is the throttle valve, the throttle valve may be closed after the stop of the internal combustion engine, and, when restarting the internal combustion engine, the internal combustion engine may also be restarted in a valve-closed state of the throttle valve.

In the case of augmenting the intake air quantity by increasing the valve-opening degree of the throttle valve just before the stop of the internal combustion engine, there occurs a state wherein a larger amount of air remains in the intake passage even after the internal combustion engine has actually stopped.

Therefore, if the internal combustion engine is restarted in a valve-opened state of the throttle valve, the inflow air quantity becomes excessive, and an abrupt increase in torque, deterioration of burning noises, etc are liable to occur. This being the case, the excessive increase in the inflow air quantity is restrained by setting the throttle valve in the valve-closed state when restarting the internal combustion engine. As a result, it is possible to restrain the abrupt increase in the torque, the deterioration of the burning noises and so on.

Note that the throttle valve may not be closed after the stop of the internal combustion engine. For instance, the throttle valve may be closed at a point of time when judging that the air quantities in the explosion stroke cylinder and in the compression stroke cylinder each become a specified air quantity if the throttle valve is closed after augmenting the inflow air quantities into the explosion stroke cylinder and into the compression stroke cylinder by increasing the valve-opening degree of the throttle valve.

Herein, the specified air quantity is an air quantity from which the scatter in the crank angle when the internal combustion engine stops can be judged to fall within an allowable range.

In this case, the quantity of the air remaining in the intake passage after the stop of the internal combustion engine can be restrained to a greater degree than in the case of closing the throttle valve after the actual stop of the internal combustion engine. Therefore, it is feasible to further restrain the intake air quantity from becoming excessive when restarting the internal combustion engine.

Moreover, in the present invention, in the case of further providing restart air quantity judging means for judging, when restarting the internal combustion engine in the valve-closed state of the throttle valve, whether or not the inflow air quantity is less than an air quantity needed for restarting the internal combustion engine, the throttle valve may be opened if the restart air quantity judging means judges that the inflow air quantity is less than the inflow air quantity needed for restarting the internal combustion engine when the internal combustion engine is restarted.

According to this control, deficiency in the inflow air quantity can be restrained when restarting the internal combustion engine. Accordingly, the internal combustion engine can be started more surely.

In the invention, the stopping condition of the internal combustion engine is established, and, if a restart request of the internal combustion engine is made when the inflow air quantity control means decreases the inflow air quantity, the inflow air quantity control means may increase the inflow air quantity. On the other hand, if the restart request of the internal combustion engine is made when the inflow air quantity control means increase the inflow air quantity, the inflow air quantity control means may decrease the inflow air quantity when the inflow air quantity is larger than the air quantity equivalent to a requested load on the internal combustion engine at a point of time of the restart request being made, and the inflow air quantity control means may further increase the inflow air quantity when the inflow air quantity is smaller than the air quantity equivalent to the requested load on the internal combustion engine at the point of time of the restart request being made.

According to this control, even in a case where the restart request is made after the stopping condition of the internal combustion engine has been established and at the timing before the actual stop of the internal combustion engine, the internal combustion engine can be started corresponding more exactly to the requested load.

Further, in the present invention, the internal combustion engine is a multi-cylinder internal combustion engine, and there may be further included fuel supplying means for supplying a fuel into the compression stroke cylinder when the rotational speed of the engine is equal to or smaller than the rotational speed just before the stop and when the compression stroke cylinder is at a timing after the intake stroke in the case of increasing the inflow air quantities into the explosion stroke cylinder and into the compression stroke cylinder when the rotational speed of the engine becomes equal to or smaller than the rotational speed just before the stop.

In this case, the fuel supplied by the fuel supplying means forms a pre-mixture, and this pre-mixture serves for the combustion in the compression cylinder at the restarting time of the internal combustion engine. Then, in the invention, there is restrained the scatter in the crank angle when restating the internal combustion engine after the stop thereof, i.e., a scatter in position of a piston in the cylinder. Therefore, it is possible to control, to a more preferable value, an air/fuel ratio of the pre-air/fuel mixture formed of the fuel supplied by the fuel supplying means and the air remaining in the compression stroke cylinder. As a result, ignition can be done more surely when starting the internal combustion engine. This enables the internal combustion engine to be restarted more surely.

Moreover, in such a case, when the restart request of the internal combustion engine is made after the fuel supplying means has supplied the fuel into the compression stroke cylinder, if the inflow air quantity into the compression stroke cylinder is increased corresponding to the requested load when making the restart request, the air quantity in the compression cylinder becomes excessive, and therefore the pre-mixture is liable to spontaneously be ignited at a timing before the vicinity of a top dead center of the compression stroke.

Hence, in the invention, in such a case, when the inflow air quantity control means increases the inflow air quantity and if the restart request of the internal combustion engine is given after the fuel supplying means has supplied to fuel into the compression stroke cylinder, the inflow air quantity may be inhibited from increasing up to the air quantity equivalent to the requested load on the internal combustion engine till the stop of the internal combustion engine even when the inflow air quantity is less than the inflow air quantity equivalent to the requested load on the internal combustion engine at a point of time of the restart request being made.

According to this control, when restarting the internal combustion engine, it is possible to restrain the pre-mixture from being spontaneously ignited in the compression stroke cylinder at the timing before the top dead center of the compression stroke.

Moreover, a second invention adopts the following means.

Namely, a control method of an internal combustion engine according to the second invention comprises decreasing an air quantity of air flowing into a cylinder of the internal combustion engine during a period from the time when a stopping condition of the internal combustion engine has been established and after fuel injection in the internal combustion engine has been stopped to the time when a rotational speed of the internal combustion engine reaches a specified rotational speed, and increasing the air quantity of the air flowing into the cylinder of the internal combustion engine after the rotational speed of the internal combustion engine becomes equal to or smaller than the specified rotational speed.

The specified rotational speed given herein is the same as the specified rotational speed according to the first invention. Further, in the second invention also, as in the first invention, when reducing the inflow air quantity, the inflow air quantity is made smaller than the inflow air quantity at a point of time when the stopping condition of the internal combustion engine is established. Moreover, when increasing the inflow air quantity, the inflow air quantity may be made larger than the inflow air quantity at the point of time when the stopping condition of the internal combustion engine is established. Still further, the inflow air quantity may be made larger than the inflow air quantity when reducing the inflow air quantity.

In the second invention also, the in-cylinder pressure decreases during the period from the stopping condition of the internal combustion engine has been established to the time when the rotational speed of the engine comes to the specified rotational speed. Therefore, the vibrations of the internal combustion engine can be restrained. Moreover, there rises the in-cylinder pressure just before the actual stop of the internal combustion engine. It is therefore feasible to restrain the scatter in the crank angle when the internal combustion engine stops. This enables the internal combustion engine to stop and start more preferably.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

In the following, specific embodiments of the control device and control method of an internal combustion engine according to the present will be described with reference to the drawings.

Embodiment 1

Figure 1:
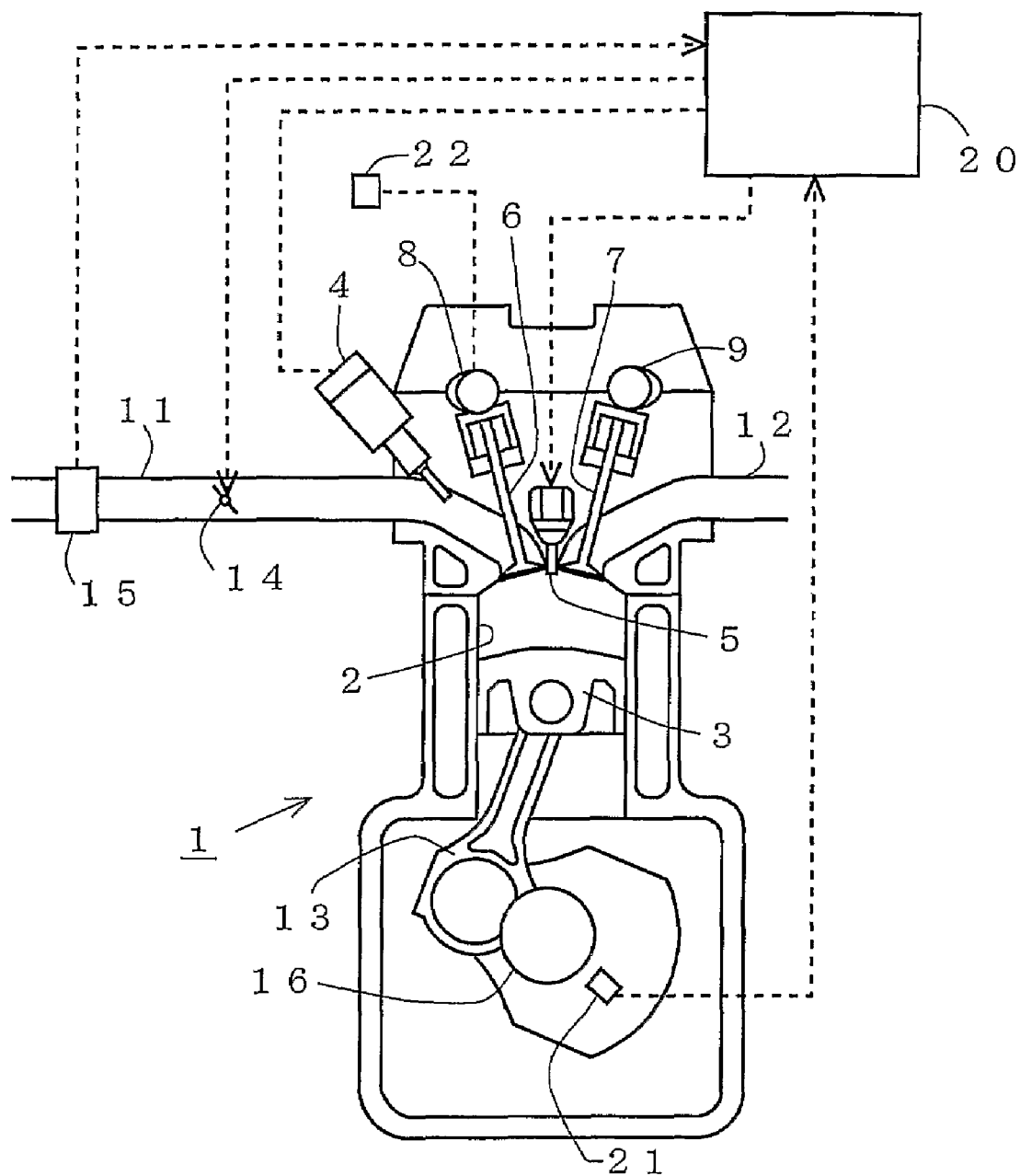
FIG. 1 is a view showing an outline of constructions of an internal combustion engine and its intake/exhaust system according to an embodiment of the present invention.

FIG. 1 is a view showing an outline of constructions of the internal combustion engine and of its intake/exhaust system according to the present embodiment. An internal combustion engine 1 is a 4-cylinder gasoline engine having four cylinders 2. An intake passage 11 and an exhaust passage 12 are connected to the cylinder 2 so that aperture portions thereof are opened to a combustion chamber. The intake passage 11 is provided with a fuel injection valve 4 for injecting a fuel toward the aperture portion into the intake passage 11. Further, the intake passage 11 is provided with a throttle valve 14 for controlling a quantity of air flowing within the intake passage 11 and with an airflow meter 15 for outputting an electric signal corresponding to the quantity of air flowing within the intake passage 11. The intake passage 11 branches off downstream of the throttle valve 14 and is connected to each of the cylinders 2.

Further, the internal combustion engine 1 is provided with an intake valve 6 and an exhaust valve 7 that open and close the aperture portions, leading to the combustion chamber, of the intake passage 11 and of the exhaust passage 12. The intake valve 6 and the exhaust valve 7 are driven by rotating an intake-side cam shaft 8 and an exhaust-side cam shaft 9, respectively. The intake-side cam shaft 8 and the exhaust-side cam shaft 9 operate interlocking with each other.

An ignition plug 5 for igniting an air-fuel mixture flowing into the cylinder 2 is installed on an upper portion of the cylinder 2.

Moreover, a piston 3 is slidably provided in the cylinder 2. The piston 3 is connected to a crank shaft 16 via a connecting rod 13, and the crank shaft 16 rotates with reciprocating motions of the piston 3.

Further, the internal combustion engine 1 includes a cam position sensor 22 for detecting a cam angle of the intake-side cam shaft 8, and a crank position sensor 21 for detecting a crank angle of the crank shaft 16.

To the internal combustion engine 1 having the above-described structure, an electronic control unit (ECU) 20 for controlling the internal combustion engine 1 is annexed. The ECU 20 is a unit for controlling the running state of the internal combustion engine 1 in accordance with running conditions of the internal combustion engine 1 or driver's demands.

This ECU 20 is a unit for controlling an operation state of the internal combustion engine 1 in accordance with an operating condition of the internal combustion engine 1 and in response to a request of a driver. The ECU 20 is electrically connected to a variety of sensors such as the airflow meter 15, the crank position sensor 21 and the cam position sensor 22, and output signals of these sensors are inputted to the ECU 20. Moreover, the ECU 20 is electrically connected to the throttle valve 14, the fuel injection valve 4 and the ignition plug 5, and is capable of controlling these components.

Next, a control of the throttle valve when stopping the internal combustion engine 1 will be described.

During a period from the time when the fuel injection from the fuel injection valve 4 stops by a stopping condition of the internal combustion engine 1 being established to the time when the internal combustion engine 1 actually stops, the rotational speed of the engine gradually decreases. At this time, as an in-cylinder pressure of the cylinder 2 becomes higher, vibrations of the internal combustion engine 1 get easier to rise. While on the other hand, the in-cylinder pressure when the internal combustion engine 1 actually stops becomes lower, a scatter in the crank angle when actually stopped gets easier to occur.

Such being the case, in the present embodiment, when stopping the internal combustion engine 1, the fuel injection from the fuel injection valve 4 is stopped, and at the same time a valve-opening degree of the throttle valve 14 is initially decreased in order to reduce a quantity of intake air into the cylinder 2. Then, the valve-opening degree of the throttle valve 14 is increased just before the internal combustion engine 1 actually stops in order to gain a rise in the quantity of the intake air into the cylinder. At this time, in the case of decreasing the valve-opening degree of the throttle valve 14, the valve-opening degree is set smaller than the valve-opening degree of the throttle valve 14 at a point of time when the stopping condition of the internal combustion engine 1 is established. Further, in the case of increasing the valve-opening degree of the throttle valve 14, the valve-opening degree may be set larger than the valve-opening degree of the throttle valve 14 at a point of time when the stopping condition of the internal combustion engine 1 is established, and may also be set larger than the valve-opening degree when decreasing the valve-opening degree of the throttle valve 14.

Figure 2:
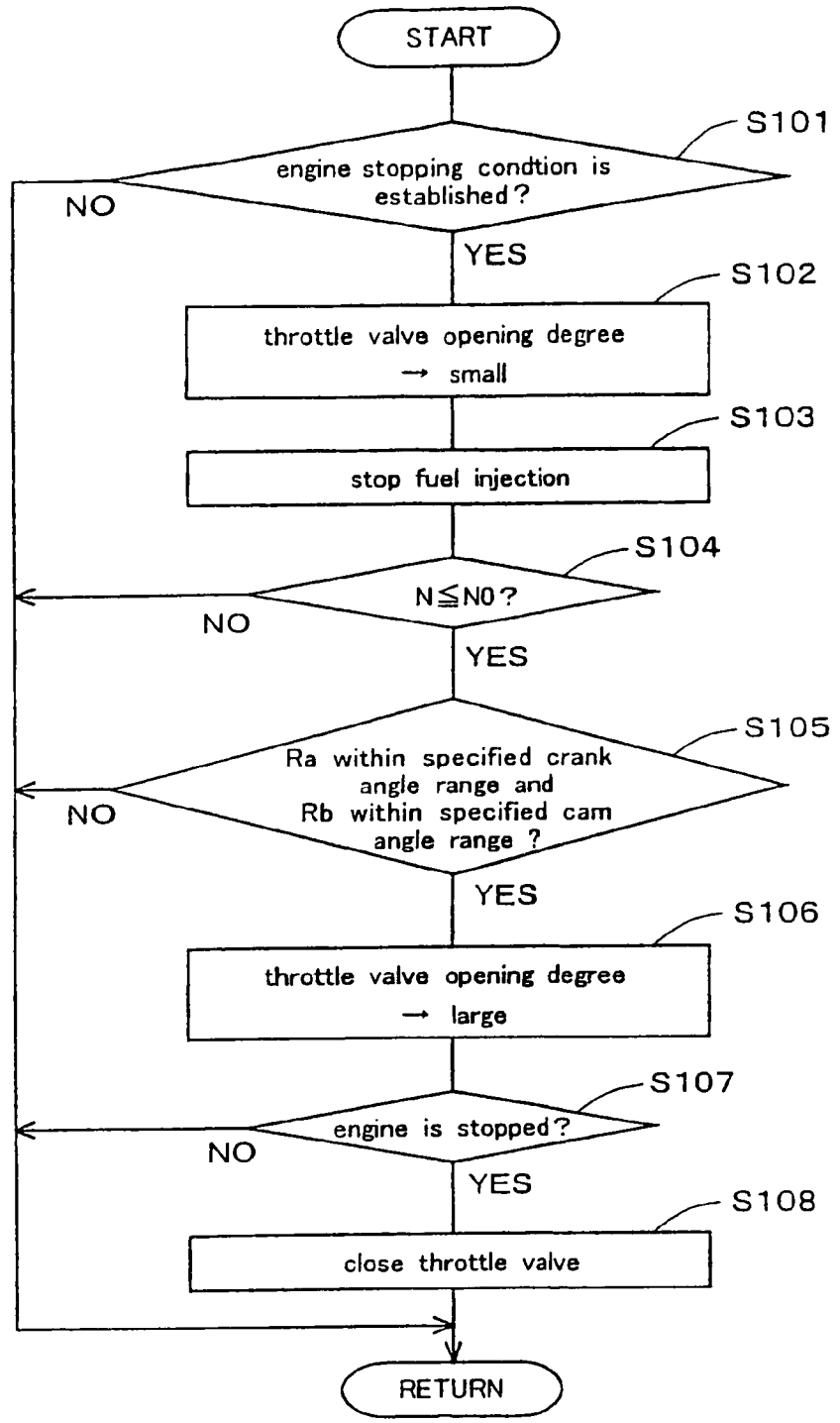
FIG. 2 is a flowchart showing a throttle control routine when stopping the internal combustion engine according to an embodiment 1.

Herein, a throttle valve control routine when stopping the internal combustion engine 1 in this embodiment will be described with reference to a flowchart shown in FIG. 2. This control routine is pre-stored in the ECU 20 and is repeated at an interval of a specified period of time.

In the control routine, the ECU 20, to begin with, in S101, judges whether the stopping condition for stopping the internal combustion engine 1 is established or not. Herein, what can be exemplified as the stopping condition is ignition-OFF by the driver. Further, if the internal combustion engine 1 is applied to an economy running system and a hybrid system, an auto-stop condition of the internal combustion engine 1 in these systems may be set as the stopping condition herein. The ECU 20 advances to S102 if judged to be affirmative in S101, and finishes executing the present routine whereas if judged to be negative.

The ECU 20 advancing to S102 decreases the valve-opening degree of the throttle valve 14 in order to decrease the quantity of the inflow air into the cylinder 2.

Next, the ECU 20 advances to S103, and stops the fuel injection from the fuel injection valve 4.

Subsequently, the ECU 20 advances to S104, wherein the ECU 20 judges whether or not a rotational speed N of the internal combustion engine 1 at the present time is equal to or lower than the rotational speed just before the stop (which is, i.e., the rotational speed from which the internal combustion engine 1 can be judged to be stopped when the crank shaft 16 of the internal combustion engine 1 rotates for one more cycle). The ECU 20 advances to S105 if judged to be affirmative in S104 and finishes executing this routine whereas if judged to be negative.

The ECU 20 advancing to S105 judges whether or not a crank angle Ra at the present time is within a specified crank angle range and whether or not a cam angle Rb of the intake-side cam shaft 8 at the present time is within a specified cam angle range.

Herein, the specified crank angle range and the specified cam angle range are defined as ranges in which when the crank angle Ra is within the specified crank angle range and when the cam angle Rb of the intake-side cam shaft 8 is within the specified cam angle range, in the case of increasing the intake air quantity by gaining the rise in the valve-opening degree of the throttle valve 14, there are increases in only the inflow air quantities into an explosion stroke cylinder coming to an explosion stroke when the internal combustion engine 1 actually stops and into a compression stroke cylinder coming to a compression stroke when the internal combustion engine 1 actually stops among the four cylinders. The ECU 20 advances to S106 if judged to be affirmative in S105 and finishes executing the present routine whereas if judged to be negative.

The ECU 20 advancing to S106 increases the valve-opening degree of the throttle valve 14.

Next, the ECU 20 advances to S107 and judges whether or not the internal combustion engine 1 actually stops, i.e., whether or not the rotational speed of the internal combustion engine 1 becomes substantially "0". The ECU 20 advances to S108 if judged to be affirmative in S107 and finishes executing this routing whereas if judged to be negative.

The ECU 20 advancing to S108 closes the throttle valve 14 and terminates the execution of the present routine.

Figure 3:
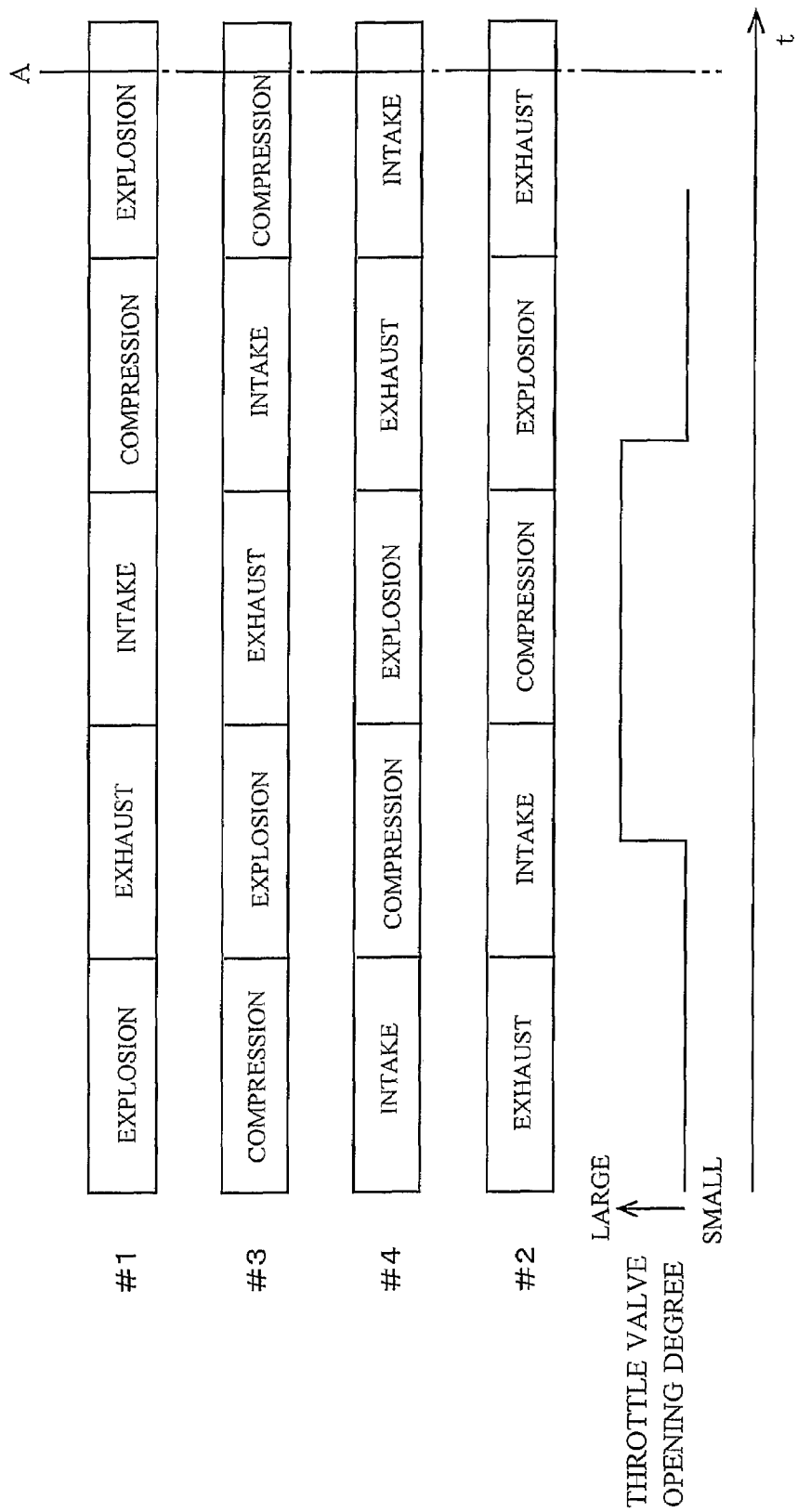
FIG. 3 is a time chart showing a relationship between a state of each cylinder and a valve-opening degree of a throttle valve when a rotational speed of the engine becomes equal to or smaller than a rotational speed just before a stop.

When controlling the throttle valve 14 based on the control routine described above, the rotational speed N of the internal combustion engine 1 becomes equal to or lower than the rotational speed N0 just before the stop, in which case a relationship between a combustion cycle of each cylinder 2 and the valve-opening degree of the throttle valve becomes as shown in FIG. 3. FIG. 3 is a time chart showing a relationship between a state of each cylinder 2 and the valve-opening degree of the throttle valve 14 when the rotational speed N of the internal combustion engine 1 is equal to or lower than the rotational speed N0 just before the stop, wherein the explosion stroke cylinder is set as a first cylinder, the compression stroke cylinder is set as a third cylinder, an intake stroke cylinder coming to an intake stroke when the internal combustion engine 1 stops is set as a fourth cylinder, and an exhaust stroke cylinder coming to an exhaust stroke when the internal combustion engine 1 stops is set as a second cylinder. In FIG. 3, a one-dotted chain line A represents timing when the internal combustion engine 1 actually stops.

According to the control routine described above, the valve-opening degree of the throttle valve 14 is increased at the timing when the inflow air into the first cylinder and into the third cylinder rises, and hence the valve-opening degree of the throttle valve 14 reaches a large state when the first cylinder is at the intake stroke and when the third cylinder is at the intake stroke. There is, however, a response delay till the air flowing into the cylinder 2 actually changes since the valve-opening degree of the throttle valve 14 was changed, and therefore, as shown in FIG. 3, the valve-opening degree of the throttle valve 14 starts increasing at a timing before the first cylinder reaches the intake stroke. This response delay period of the change in the inflow air quantity can be obtained beforehand by experiments etc.

According to the present embodiment, it follows that the inflow air quantity decreases during the period from the time when the stopping condition of the internal combustion engine 1 was established to the time just before the actual stop of the internal combustion engine 1. As a result, an in-cylinder pressure is reduced during this period, and hence the vibrations of the internal combustion engine 1 can be restrained. Further, just before the actual stop of the internal combustion engine 1, it follows that the inflow air quantities into the compression stroke cylinder and into the explosion stroke cylinder rise. As a result, there increases reaction by the air in the explosion stroke cylinder and in the compression stroke cylinder when the internal combustion engine 1 actually stops, and hence the scatter in the crank angle when the internal combustion engine 1 stops can be restrained. It is therefore possible to stop and start the internal combustion engine 1 more preferably.

Moreover, according to the present embodiment, the inflow air quantity is decreased till the rotational speed N becomes equal to or lower than the rotational speed N0 just before the stop, and further the inflow air quantities into the intake stroke cylinder and into the exhaust stroke cylinder decrease even after the rotational speed N becomes equal to or lower than the rotational speed N0 just before the stop. It is therefore possible to further delay the timing when increasing the inflow air quantity. As a result, the vibrations of the internal combustion engine 1 can be more restrained.

Note that in this embodiment, after the internal combustion engine 1 has actually stopped, the throttle valve 14 opens, however, in the case of restarting the internal combustion engine 1, the internal combustion engine 1 is restarted in a valve-closed state of the throttle valve 14.

The throttle valve 14 is set in the valve-closed state when restarting the internal combustion engine 1, thereby making it possible to restrain the air remaining in the intake passage 11 disposed upstream of the throttle valve 14 from flowing into the cylinder 2. Accordingly, it is feasible to restrain an excessive rise in the inflow air quantity when restarting the internal combustion engine 1 and, resultantly, to restrain an abrupt increase in torque, deterioration in combustion noise, and so on.

MODIFIED EXAMPLE

Figure 4:
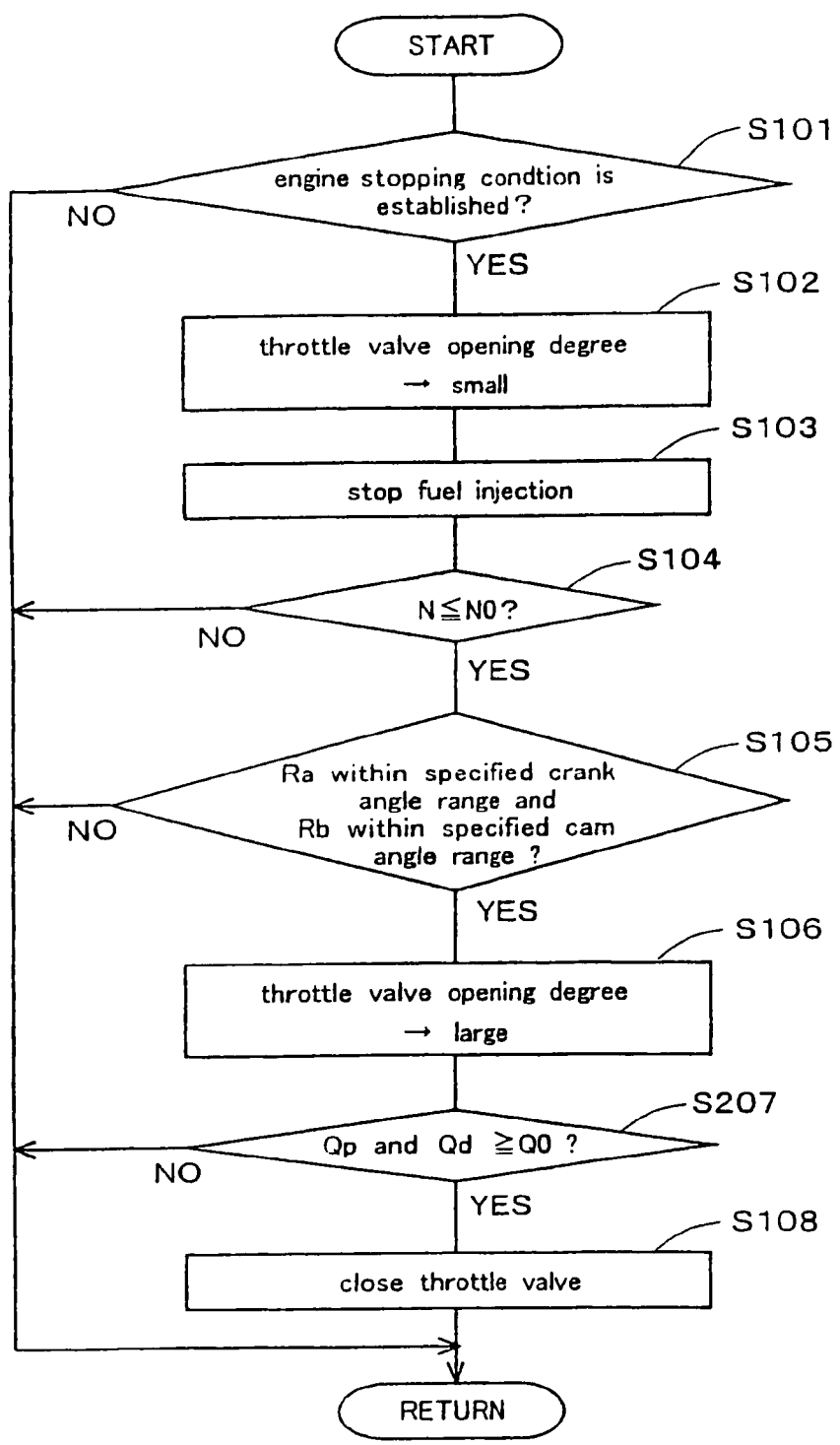
FIG. 4 is a flowchart showing a throttle control routine when stopping the internal combustion engine according to a modified example of the embodiment 1.

Herein, a modified example of the present embodiment will be explained with reference to FIG. 4. FIG. 4 is a flowchart showing a throttle valve control routine when stopping the internal combustion engine 1 in the modified example of the present embodiment. The flowchart shown in FIG. 4 is substantially the same as the flowchart shown in FIG. 2 except S207. Hence, an explanation about only S207 will be give herein, and the descriptions of other steps are omitted. Note that this control routine is also pre-stored in the ECU 20 and repeated at the interval of the specified period of time.

In this control routine, the ECU 20, after increasing the valve-opening degree of the throttle valve 14 in S106, advances to S207.

In S207, the ECU 20, when closing the throttle valve at the present time, judges whether or not an air quantity Qp in the compression stroke cylinder and an air quantity Qd in the explosion stroke cylinder are each equal to or larger than a specified air quantity Q0. Herein, the specified air quantity Q0 is an air quantity from which the scatter in the crank angle when the internal combustion engine 1 stops can be judged to fall within an allowable range. The ECU 20 advances to S108 if judged to be affirmative in S207 and terminates the execution of the present control routine whereas if judged to be negative.

Further, in this instance also, in the case of restarting the internal combustion engine 1, the internal combustion engine 1 is restarted in the valve-closed state of the throttle valve 14.

According to the present modified example, the throttle valve 14 opens before the internal combustion engine 1 actually stops, thereby making it possible to restrain the quantity of the air remaining in the intake passage 11 after the actual stop of the internal combustion engine 1 and consequently to further restrain the intake air quantity from becoming excessive when restarting the internal combustion engine 1.

Embodiment 2

An outline of the constructions of the internal combustion engine and of the intake/exhaust system according to an embodiment 2, is substantially the same as in the embodiment 1. Moreover, the control of the throttle valve when stopping the internal combustion engine is also the same as in the embodiment 1. Therefore, the explanations thereof are omitted.

Herein, the control of the throttle valve 14 when restarting the internal combustion engine after the stopping condition of the internal combustion engine 1 has been established will be described.

In the embodiment 2, a rise in the inflow air quantity is gained by increasing the valve-opening degree of the throttle valve 14 just before the stop of the internal combustion engine 1, and thereafter the throttle valve is closed. Even in such a case, however, as when there is a long period from the time when the internal combustion engine 1 actually stopped to the time of the restarting, there might be a case in which the air quantity in the intake passage 11 disposed downstream of the throttle valve 14 becomes deficient for burning, in the cylinder 2, the fuel injected for restarting.

Such being the case, according to the embodiment 2, in the case where a restart request is made after the actual stop of the internal combustion engine 1 and where the inflow air quantity becomes deficient for burning the fuel in the valve-closed state of the throttle valve 14, the internal combustion engine 1 is restarted in the valve-opened state of the throttle valve 14.

Further, there is a case in which the restart request is given at a timing before the actual stop of the internal combustion engine 1 after the stopping condition of the internal combustion engine 1 has been established. In such a case, the valve-opening degree of the throttle valve 14 is controlled based on a relationship between the inflow air quantity at a point of time when the restart request is made and a requested load.

Figure 5:
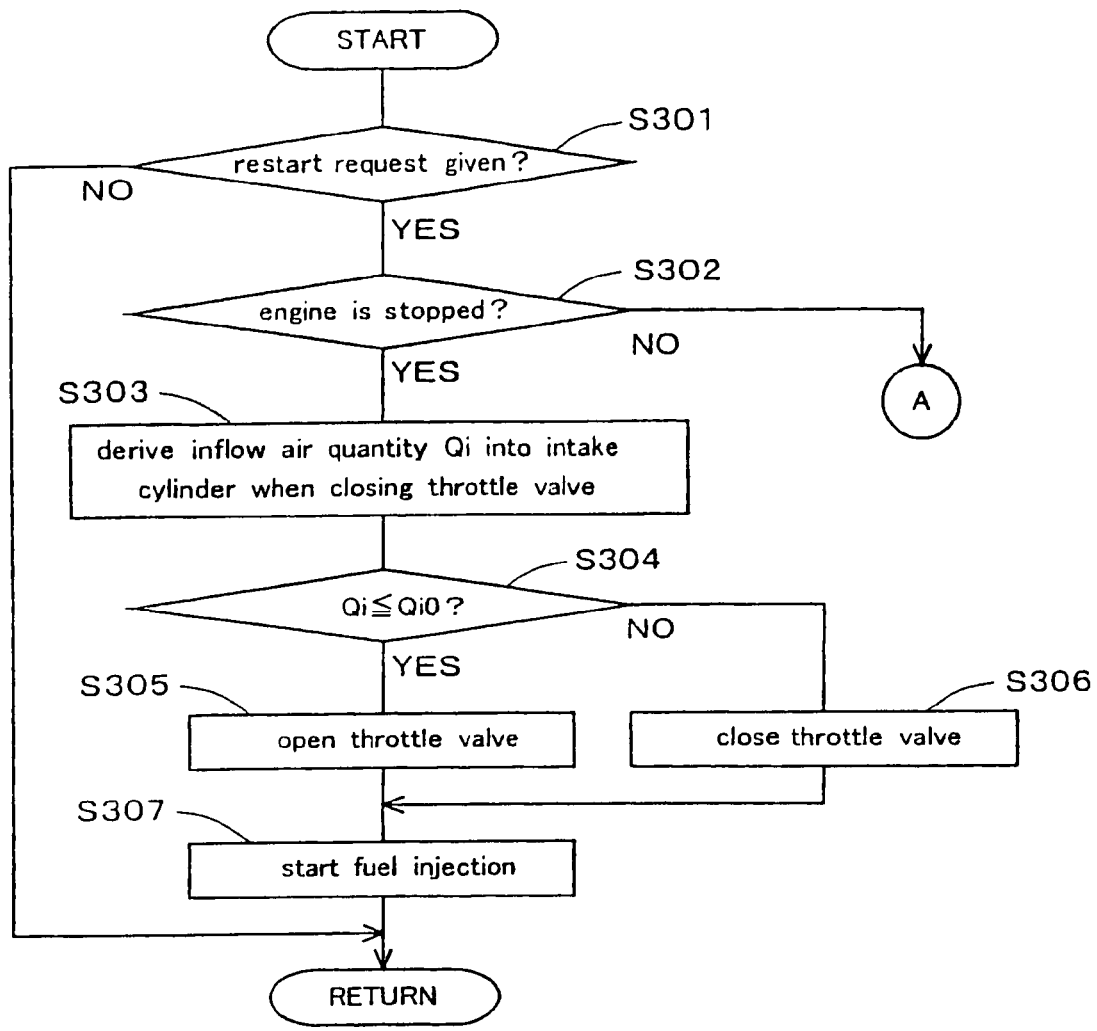
FIG. 5 is a flowchart showing part of a throttle control routine when restarting the internal combustion engine according to an embodiment 2.
Figure 6:
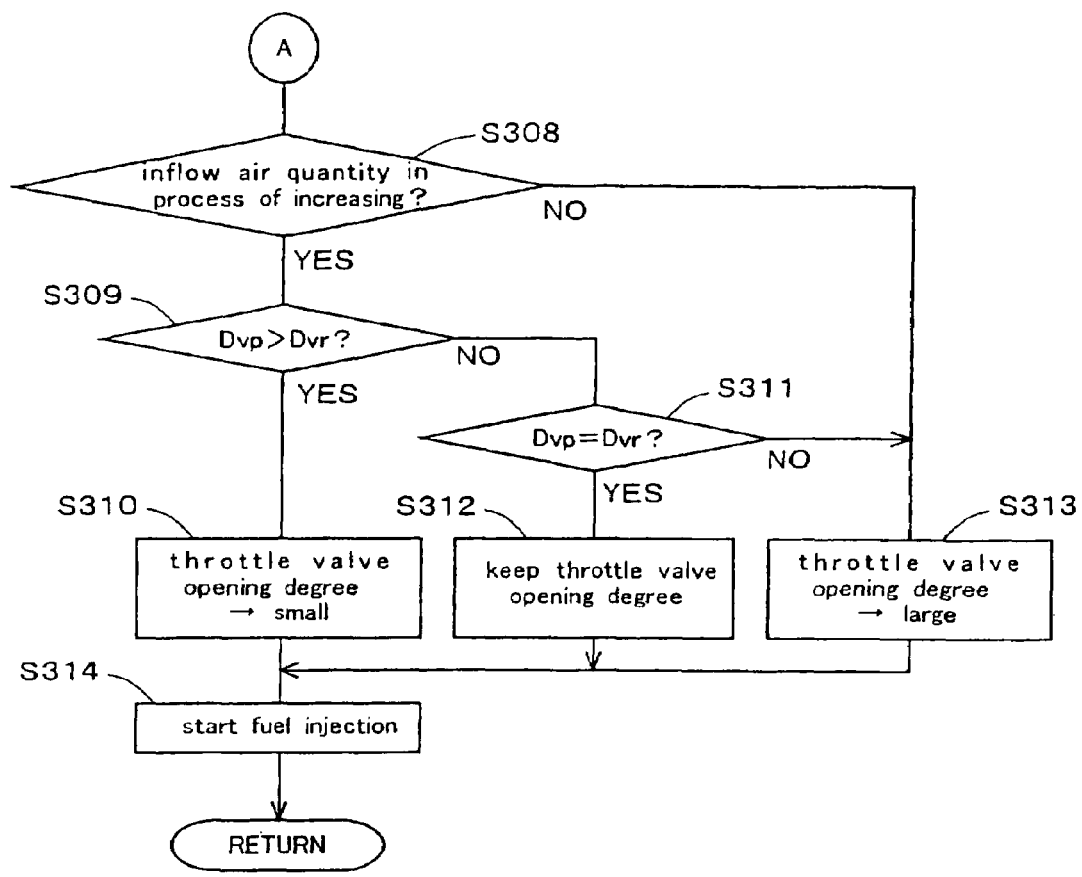
FIG. 6 is a flowchart showing part of the throttle control routine when restarting the internal combustion engine according to the embodiment 2.

Herein, a throttle valve control routine when restarting the internal combustion engine 1 in the embodiment 2 will be described with reference to flowcharts shown in FIGS. 5 and 6. The present control routine is pre-stored in the ECU 20 and repeated at the interval of the specified period of time after the stopping condition, described in the embodiment 1, of the internal combustion engine 1 has been established.

In the present control routine, the ECU 20, at first in S301, judges whether a restart request of the internal combustion engine 1 is made or not. Herein, what can be exemplified as the restart request is accelerator-ON by the driver. Further, if the internal combustion engine 1 is applied to the economy running system and the hybrid system, the restart request may be judged to be made when an auto-start condition of the internal combustion engine 1 in these systems is established. The ECU 20 advances to S302 if judged to be affirmative in S301 and finishes executing the present control routine whereas if judged to be negative.

In S302, the ECU 20 judges whether or not the internal combustion engine 1 is in an actually-stopped state. The ECU 20 advances to S303 if judged to be affirmative in S302 and advances to S308 whereas if judged to be negative.

In S303, the ECU 20 derives an inflow air quantity Qi of the air flowing into the intake stroke cylinder in the case of restarting the internal combustion engine 1 in the valve-closed state of the throttle valve 14 at the present time. Herein, the inflow air quantity Qi may be derived based on the air quantity on the downstream side of the throttle valve 14 in the intake passage 11 at a point of time when the internal combustion engine 1 stops and on the elapse time from the stop of the internal combustion engine 1.

Next, the ECU 20 advances to S304 and judges whether or not the inflow air quantity Qi is less than a specified inflow air quantity Qi0. Herein, the specified inflow air quantity Qi0 is an air quantity needed for burning, in the cylinder, the fuel supplied into the intake stroke cylinder in order to start the internal combustion engine 1. The ECU 20 advances to S305 if judged to be affirmative in S304 and advances to S306 whereas if judged to be negative.

The ECU 20 advancing to S305 opens the throttle valve 14 and advances to S307.

On the other hand, the ECU 20 advancing to S306 advances to S307 in a way that keeps the throttle valve 14 in the valve-closed state.

In S307, the ECU 20 starts the fuel injection from the fuel injection valve 4 in order to start the internal combustion engine 1, and thus supplies the fuel into the intake stroke cylinder. Thereafter, the ECU 20 finishes executing the present control routine.

On the other hand, the ECU advancing to S308 judges whether the inflow air quantity is in the process of increasing or not. Namely, the ECU 20 judges whether the valve-opening degree of the throttle valve 14 is increased or not. The ECU 20 advances to S309 if judged to be affirmative in S308 and advances to S313 whereas if judged to be negative.

The ECU 20 advancing to S309 judges whether or not the valve-opening degree Dvp of the throttle valve 14 at the present time is larger than the valve-opening degree Dvr, corresponding to the requested load of the internal combustion engine 1, of the throttle valve 14 (which will hereinafter be termed a requested valve-opening degree). The ECU 20 advances to S310 if judged to be affirmative in S309 and advances to S311 whereas if judged to be negative.

The ECU 20 advancing to S310 sets the valve-opening degree of the throttle valve 14 to the requested valve-opening degree Dvr by decreasing the valve-opening degree of the throttle valve 14, and advances to S314.

On the other hand, the ECU 20 advancing to S311 judges whether or not the valve-opening degree Dvp of the throttle valve 14 at the present time is equal to the requested valve-opening degree Dvr. The ECU 20 advances to S312 if judged to be affirmative in S311 and advances to S313 whereas if judged to be negative.

The ECU 20 advancing to S312 keeps the valve-opening degree Dvp of the throttle valve 14 at the present time and then advances to S314.

Whereas if judged to be negative in S308, i.e., when the throttle valve 14 is narrowed down and the inflow air quantity is in the process of decreasing, and if judged to be negative in S311, the valve-opening degree Dvp of the throttle valve 14 at the present time can be judged to be smaller than the requested valve-opening degree Dvr. Therefore, the ECU 20 advancing to S313 increases the valve-opening degree of the throttle valve 14 up to the requested valve-opening degree Dvr, and advances to S314.

In S314, the ECU 20 starts the fuel injection from the fuel injection valve 4 in order to start the internal combustion engine 1, and supplies the fuel into the intake stroke cylinder. Thereafter, the ECU 20 terminates the execution of the present control routine.

According to the embodiment 2, when the restart request is made after the internal combustion engine 1 has actually stopped, the inflow air quantity is restrained from becoming deficient due to the fuel combustion as the throttle valve 14 is in the valve-closed state. Accordingly, the internal combustion engine 1 can be restarted more surely.

Further, even when the restart request is made at timing before the actual stop of the internal combustion engine 1 after the stopping condition of the internal combustion engine 1 has been established, the inflow air quantity can be controlled to a quantity corresponding to the requested load of the internal combustion engine 1. Namely, the internal combustion engine 1 can be started corresponding to the requested load.

MODIFIED EXAMPLE

Herein, a modified example of the embodiment 2 will be explained. In this modified example, the control of the throttle valve 14 when stopping the internal combustion engine 1 is the same as the aforementioned, however, after the stopping condition of the internal combustion engine 1 has been established, when the rotational speed N is equal to or lower than the rotational speed N0 before the stop and when the compression stroke cylinder reaches the intake stroke, the compression stroke cylinder is supplied with the fuel by injecting the fuel from the fuel injection valve 4.

In this case, the fuel (which will hereinafter be referred to as a pre-composite fuel) supplied into the compression stroke cylinder just before the stop of the internal combustion engine 1 forms a pre-mixture, and this pre-mixture serves for the combustion in the compression stroke cylinder when restarting the internal combustion engine. Then, in the embodiment 2, there is restrained the scatter in the crank angle when restarting the internal combustion engine 1 after the internal combustion engine 1 has stopped, i.e., the scatter in the position of the piston in the compression stroke cylinder. It is therefore feasible to control, to a more preferable value, an air-fuel ratio of the pre-mixture formed of the pre-composite fuel and the air remaining in the compression stroke cylinder. As a result, the ignition when starting the internal combustion engine 1 can be more ensured, thereby enabling the internal combustion engine 1 to be restarted more surely.

Further, in such a case, when the restart request of the internal combustion engine 1 is made after the pre-composite fuel has been supplied into the compression stroke cylinder, if the inflow air quantity into the compression stroke cylinder is increased corresponding to the requested load on the occasion of making the restart request, the air quantity in the compression stroke cylinder becomes excessive, and the pre-mixture might be spontaneously ignited at a timing before the vicinity of a top dead center of the compression stroke.

Therefore, in this modified example, if the restart request of the internal combustion engine 1 is given after the time when injecting the pre-composite fuel, the valve-opening degree of the throttle valve 14 is inhibited from increasing up to the requested valve-opening degree Dvr till the actual stop of the internal combustion engine 1 even if the valve-opening degree of the throttle valve 14 is smaller than the requested valve-opening degree Dvr at a point of time when the restart request is made.

According to this contrivance, it is possible to restrain the inflow air quantity into the compression stroke cylinder from excessively increasing when restarting the internal combustion engine 1. As a result, the pre-composite fuel can be restrained from being spontaneously ignited at the timing before the top dead center of the compression stroke.

While the invention has been described in terms of preferred embodiments, those skilled in the art will recognize that the invention can be practiced with modifications within the spirit and scope of the appended claims.

INDUSTRIAL APPLICABILITY

According to the control device and the control method of the internal combustion engine, it is possible to restrain the vibrations when the internal combustion engine stops and also the scatter in the crank angle when the internal combustion engine stops. This enables the internal combustion engine to stop and start more preferably.

The invention claimed is:

1. A control device of an internal combustion engine, having a plurality of cylinders, comprising:
   stopping condition judging means for judging whether a stopping condition of the engine is established or not; and
   a throttle valve provided in an intake passage of the engine for controlling an air quantity of air flowing into each cylinder of the engine;
   wherein the throttle valve decreases the air quantity flowing into the cylinders from when the stopping condition is established until a rotational speed of the engine reaches a preset rotational speed,
   wherein the throttle valve increases the air quantity flowing into an explosion stroke cylinder and a compression stroke cylinder, when the rotational speed of the engine is below the preset rotational speed,
   wherein the preset rotational speed is the speed at which the engine actually stops when a crank shaft of the engine rotates for one more cycle, and
   wherein after increasing the air quantities flowing into the explosion stroke cylinder and the compression stroke cylinder by increasing the valve-opening degree of said throttle valve, said throttle valve is closed at a point of time when judging that the air quantities in said explosion stroke cylinder and in said compression stroke cylinder each come to a specified air quantity upon closing said throttle valve, and said internal combustion engine is, when restarting said internal combustion engine, restarted in the valve-closed state of said throttle valve.

2. A control device of an internal combustion engine having a plurality of cylinders, comprising:
   stopping condition judging means for judging whether a stopping condition of the engine is established or not; and
   inflow air quantity control means for controlling an air quantity of air flowing into each cylinder of the engine, the inflow air quantity control means decreases the air quantity flowing into the cylinders from when the stopping condition is established until a rotational speed of the engine reaches a preset rotational speed, and the inflow air quantity control means increases the air quantity flowing into the cylinders when the rotational speed of the engine is equal to or below the preset rotational speed,
   wherein if a restart of the engine is made when said inflow air quantity control means is decreasing the air quantity of the air flowing into said cylinder, said air quantity control means increases the air quantity of the air flowing into said cylinder, and
   if the restart request of the engine is made when said inflow air quantity control means is increasing the air quantity of the air flowing into said cylinder, said inflow air quantity control means decreases the air quantity of the air flowing into said cylinder if the air quantity of the air flowing into said cylinder at a restart time is larger than the air quantity equivalent to a requested load on the engine, and said inflow air quantity control means further increases the air quantity of the air flowing into said cylinder if the air quantity of the air flowing into said cylinder at the restart time is smaller than the air quantity equivalent to the requested load on said internal combustion engine.

3. A control device of an internal combustion engine having a plurality of cylinders, comprising:
   stopping condition judging means for judging whether a stopping condition of the engine is established or not;
   inflow air quantity control means for controlling an air quantity of air flowing into each cylinder of the engine,
   fuel supplying means for supplying fuel into a compression stroke cylinder when the rotational speed of the engine is equal to or smaller than a preset rotational speed and when said compression stroke cylinder is at a timing after an intake stroke,
   wherein the inflow air quantity control means decreases the air quantity flowing into the cylinders from when the stopping condition is established until a rotational speed of the engine reaches the preset rotational speed,
   wherein the inflow air quantity control means increases the air quantity flowing into an explosion stroke cylinder and the compression stroke cylinder, when the rotational speed of the engine is below the preset rotational speed,
   wherein the preset rotational speed is the speed at which the engine actually stops when a crank shaft of the engine rotates for one more cycle,
   wherein if a restart request of the engine is made when both said inflow air quantity control means is increasing the air quantity of the air flowing into said cylinder and said fuel supplying means is supplying fuel into said compression stroke cylinder, the inflow air quantity control means will inhibit the air quantity of the air flowing into said cylinder from increasing up to the air quantity equivalent to the requested load on the engine until the stop of the engine even if the air quantity of the air flowing into said cylinder is less than the air quantity equivalent to the requested load on the engine at a time the restart request was made.

* * * * *